Figure 2:
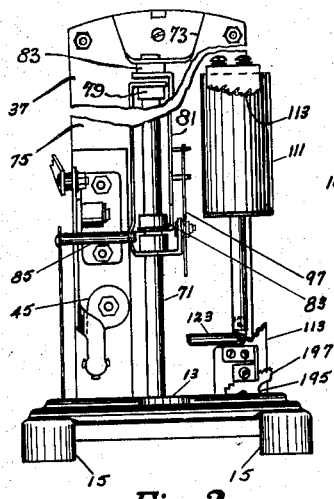

Nov. 16, 1937.  M. IRELAND  2,099,210
AUTOMATIC ELECTRIC TOASTER
Filed March 25, 1935  2 Sheets-Sheet 1

INVENTOR.
Murray Ireland
BY
ATTORNEY.

Nov. 16, 1937.   M. IRELAND   2,099,210
AUTOMATIC ELECTRIC TOASTER
Filed March 25, 1935   2 Sheets-Sheet 2

INVENTOR.
Murray Ireland
BY
ATTORNEY.

Patented Nov. 16, 1937

2,099,210

UNITED STATES PATENT OFFICE 2,099,210

AUTOMATIC ELECTRIC TOASTER

Murray Ireland, St. Paul, Minn., assignor to McGraw Electric Company, Chicago, Ill., a corporation of Delaware Application March 25, 1935, Serial No. 12,834

17 Claims. (Cl. 219—19)

My invention relates to electric cooking devices and particularly to electric toasters.

An object of my invention is to provide an electric toaster having novel means for controlling the length of time of a toasting period jointly in accordance with the moisture content of a slice of bread to be toasted and with the temperature of the toaster.

Another object of my invention is to provide a purely thermal means to control the duration of a toasting period in accordance with all of the variables entering into the toasting operation to obtain the desired degree of toasting of a slice of bread.

Another object of my invention is to provide a heat responsive control means to effect release of a latch holding a switch and a bread support in operative positions, after a length of time dependent on the temperature conditions of the surface of a slice of bread and of the toaster structure.

Another object of my invention is to provide a heat responsive timing control for an electric toaster embodying novel forms of temperature responsive control devices.

Another object of my invention is to provide an electric toaster having means therein for compensating for different thicknesses of successive slices of bread located therein.

Another object of my invention is to provide a thermally controlled electric toaster having manual means to adjust the thermal control to enable an operator to vary the operation of the toaster to suit his own desires as to the degree of toasting effected thereby.

Other objects of my invention will either be pointed out hereinafter in the course of a description of one form of device embodying my invention as now preferred by me or will be apparent from such description.

While I have illustrated and described, in detail, one form of device embodying my invention, it is to be understood that such illustration and description are not to be considered as limiting the claims thereto, but that all modifications coming within the scope of the appended claims are to be included.

In practicing my invention, I provide a casing having an opening therein for the insertion and removal of slices of bread, one or more extended electric heating units located in the casing, a control switch for the heating means, a bread slice support movable relatively to the heating means, a single spring biasing the switch to open position and the support to substantially inoperative position, a single manually-actuable means for simultaneously moving the switch to closed position and the bread slice support to operative position and a single latching means to hold them in the last named positions. I provide a plurality of thermal elements to effect release of the latch, the first thermal element comprising an initially deformed bimetal bar spring pressed into flat face engagement with one surface of a slice of bread by bread-positioning means actuated by a resilient member associated with the manually-actuable moving means, the second thermal element comprising a return-bent bimetal bar directly associated with a set of contact members controlling an electromagnetic latch-releasing means. The return-bent bimetal member has mounted thereon a mechanical means to prevent overshooting of the thermal control means or hunting thereof under varying temperature conditions of the toaster. Manually operable adjusting means is also provided to enable an operator to obtain any desired degree of toasting of successive slices of bread, within the range of operation of the toaster.

Figure 1:
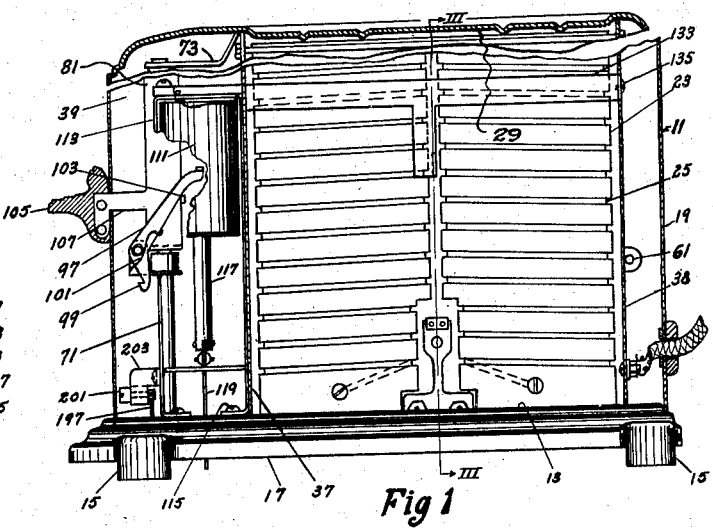
Figures 3, 4:
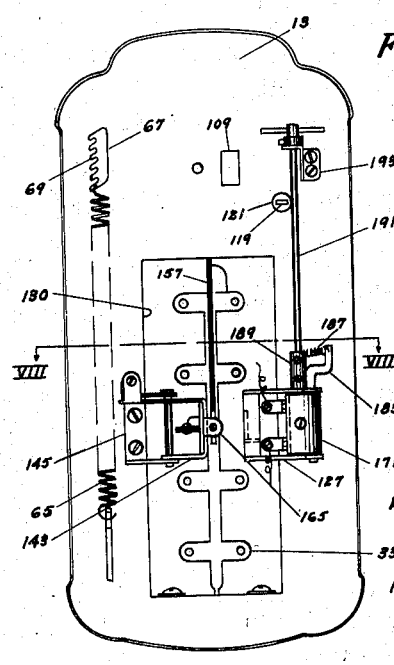
Figure 10:
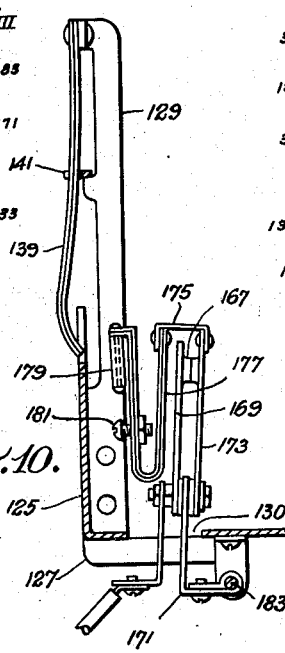
Figure 5:
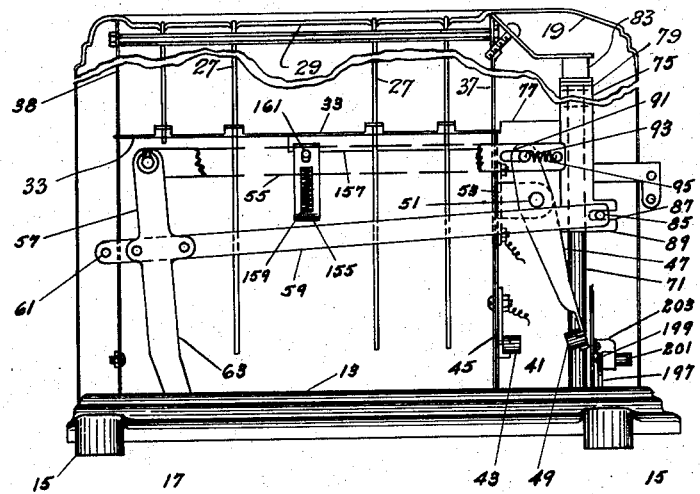
Figure 6:
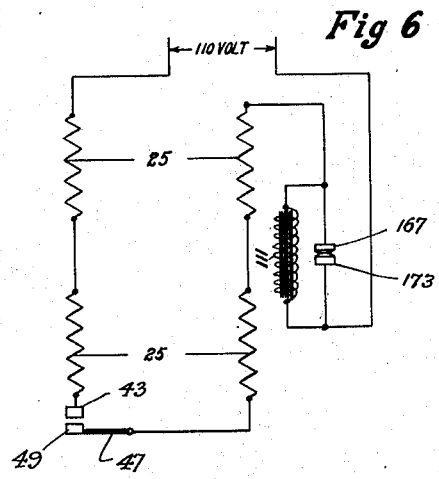
Figure 7:
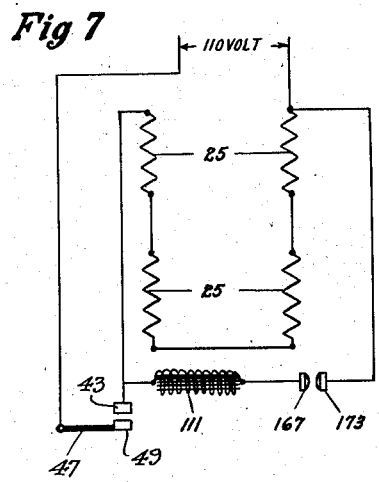
Figure 8:
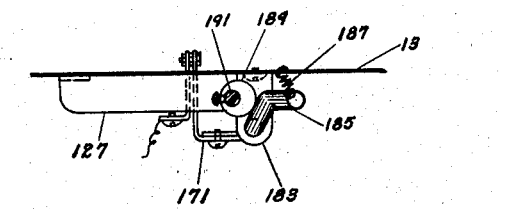
Figure 9:
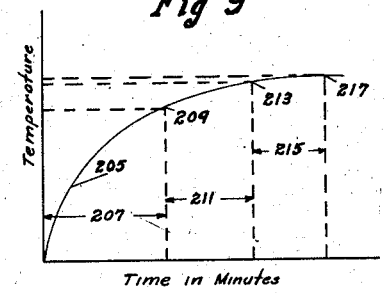

In the drawings,

Figure 1 is a view, partially in vertical longitudinal section and partially in side elevation, of an electric toaster embodying my invention, Fig. 2 is a view in front elevation thereof, with the casing removed, Fig. 3 is a view in lateral section, taken on the line III—III of Fig. 1, Fig. 4 is a bottom plan view thereof, Fig. 5 is a view in side elevation, but taken from the opposite side of that shown in Fig. 1 of the drawings, Figs. 6 and 7 are diagrammatic wiring connections which may be used, Fig. 8 is a fragmentary sectional view taken on the line VIII—VIII of Fig. 4, Fig. 9 is a curve showing the temperature rise of a toaster structure, and, Fig. 10 is a fragmentary view, in elevation and on a slightly enlarged scale, of the thermal timing device.

A toaster assembly, designated in its entirety by 11, includes a base 13 which may be made of sheet metal and which has depending integral portions 15 to constitute supports for the assembly, and to raise the bottom edges 17 of the base 13 above a horizontal surface, such as a table, upon which it may be supported. A casing 19 is also provided, the lower edge of which may be suitably secured in any desired manner to the upper surface of the base 13. The casing 19 is provided at its top portion with a slot 21 to permit of the insertion of successive slices of bread into the casing to be toasted therein and to be removed therefrom.

I provide further a plurality of vertically extending flat heating units comprising one or more sheets of electric insulating material 23, preferably mica, having wound thereon a resistance wire or ribbon 25, in a manner now well known in the art. These two heating units are spaced apart a suitable distance and are supported in such operative positions by any suitable means, not specifically shown in the drawings. A plurality of vertically extending guide wires 27 are provided, each having a short lateral extension at its upper end extending through an opening in a horizontally-extending interior top frame portion 29, the object of these vertically extending wires or rods being to guide a slice of bread as it is moved into the proper operative position between the spaced-apart heating elements and as it is removed from such operative position. The slice of bread is indicated by 31 and it is to be noted that it rests upon a horizontally extending bread slice support 33 which is movable in a vertical direction downwardly from the position shown particularly in Fig. 3 of the drawings to a position where the slice of bread is located entirely within the casing and in position to be acted upon by the radiant heat developed by the current passing through the resistor wire 25. The bread slice support 33 is provided with end extensions which move in vertical slots 35 provided in a lateral front intermediate wall 37 and in a rear intermediate wall 38 whose position is best shown in Fig. 1 of the drawings, the front partition wall being effective to divide the space within the casing into a heating or cooking chamber, namely that in which the slice of bread may be toasted, and into a mechanism chamber 39 whose position is also best shown in Fig. 1 of the drawings.

A control switch designated generally by the numeral 41 controls the energization of the plurality of heating elements and includes a substantially fixed contact device 43, which is shown more particularly in Fig. 5 of the drawings as including a carbon contact member suitably held in a clamping terminal 45. The switch includes also a movable contact arm 47 having mounted thereon a cooperating carbon contact member 49 which is adapted to engage with and be disengaged from the fixed contact member 43.

The arm 47 is pivotally mounted at 51 on a bracket 53, which bracket may be of L-shape and have one part thereof suitably secured against the partition wall 37. Means for actuating the switch arm 47 to cause closing of the switch may comprise a link 55 pivotally connected to an extension 57 on an actuating arm 59, which actuating arm is pivotally mounted on a shaft 61 which latter is suitably supported by the rear inner partition wall 38. As it is desired to bias the switch to its open position the arm 59 is further provided with a depending arm 63 extending through the base 13 and a short distance therebelow in order to have connected thereto a spring 65 which has its other end located in a slot 67 provided in the base 13, one wall of the slot being provided with a number of teeth 69 to permit of varying the tension of the spring 65. The construction of the heating elements and of the switch are well known and form no part of my present invention.

Means for moving the bread slice support 33 downwardly comprises an upright post 71 having its lower end suitably mounted in and secured to the base 13, while its upper end is similarly fixedly mounted in a forward extension 73 of the auxiliary frame member 29 hereinbefore described. A frame 75 is slidably mounted on the post 71, this frame being of substantially L-shape and having a rearwardly extending portion 77 which is suitably secured to and supports the bread slice support 33. The frame 75 is provided with lateral guide bearing extensions 79 adapted to freely slide upon the post 71. A second frame member 81 is also slidably mounted on the post 71 and has guide bearings 83 at its upper end and at its lower end. It is to be noted that the frame 81 is movable on the guide post 71 relatively to the first frame heretofore described. The arm 59 is provided at its forward end with a laterally extending pin or stub shaft 85, the outer end of which extends into and moves in a slot 87 provided in a forwardly extending portion 89 of the frame member 75 so that as the frame member 75 is moved downwardly, as by the movement of the second frame member 81, the arm 59 will be moved in a clockwise direction and thereby effect closing of the switch comprising the two carbon contact members 43 and 49. The link 55 is provided with a slot 91 adjacent its forward end and the arm 47 of the switch is provided with a pin 93 extending through the slot 91 and connected by a spring 95 to the arm 55.

A latching means to hold the switch in its closed position and the bread slice support in its operative position includes a bell crank lever 97 pivotally mounted at the lower end of the first frame member 75, and having a hook portion 99 at its lower end, the construction of this latch being best shown in Fig. 1 of the drawings. A spring wire 101 is associated therewith in such manner as to tend to turn the bell crank lever 97 in a clockwise direction so that the rear edge of the upper part thereof will rest against a stop 103 provided on the second frame member 81 hereinbefore described. When the frame members hereinbefore described are moved downwardly, as may be done by an operator pressing downwardly on an actuating knob or handle 105 secured to the second frame member 81 and more particularly to a forwardly extending portion 107 thereof, the hook portion 99 of the latch 97 will move through a suitable opening 109 in the base and engage either an edge of one wall of the opening or against a hardened steel plate, not shown in the drawings.

Electric and more particularly electromagnetic means for releasing the latch includes a coil 111 which is supported in the upper end of a strap metal frame member 113 having inturned lower end portions secured to the upper surface of the base 13 by suitable means here shown as screws 115. The coil 111 has associated therewith a vertically movable armature 117 whose upper end is guided by a suitable structure within the coil itself and whose lower end has secured thereto a bar 119 extending downwardly through an opening 121 in the base so that the armature 117 and the bar 119 will move in a substantially straight line in a vertical direction. A laterally-extending lug 123 is pivotally mounted on the bar 119 at its upper end and is of such dimensions and shape that it may engage the inner or rear arcuate surface of the upper portion of arm 97, causing the arm to move in a counterclockwise direction whereby to release the shoulder or hook 99 from its engagement with a wall of the opening 109. The spring 65 will then cause the return of the arm 59 to the position shown in Fig. 5 of the drawings whereby the switch controlling the energization of the heating elements is opened, while at the same time the bread slice support is returned to its upper or inoperative position in which a part of the slice of bread extends above the upper end of the casing so that it may be grasped by an operator and be removed from the casing.

A skeleton frame 125 is in general of L-shape and comprises a lower horizontally-extending part 127, which is of channel shape in lateral section and is secured to the under side of base 13 and which has an upwardly extending portion 129, which may be in general of bar-shape and which extends at substantially right angles to the plane of a heating element to which it is closely adjacent. The member 129 extends upwardly through the base 13 in an opening 130. Its upper end is fixedly held by an inwardly extending arm 131 which constitutes a part of an additional skeleton frame 133 whose main portion extends substantially horizontally between the front and rear partition plates, to which the ends of this horizontal member may be suitably secured as by screws 135. The member 131 has an upwardly extending arm 137 having one side of arcuate shape, as shown particularly in Fig. 3 of the drawings, in order to guide one surface of a slice of bread as it is being moved downwardly, into proper toasting position. A bimetal bar 139 has its upper end suitably rigidly secured to the upper end of arm 129 and its intermediate portion is engaged by an arm 141 having an opening therein, through which the bimetal bar extends. The bimetal bar 139 is initially bowed outwardly relative to the central vertical plane of the toaster and is so supported at its upper end that the lower end is normally located closer to the central vertical plane than is the upper end thereof. The extreme lower end portion is bent away from the central vertical plane so that it may not catch or hook into a slice of bread when the latter is being moved upwardly after having been toasted. The upper end of member 125 may be forked in order to protect the lower end of bimetal bar 139 from accidental injury.

In order that the bimetal bar 139 may be straightened out and be in close surface engagement with the slice of bread while the same is being toasted, I provide a bread slice positioning means including a bell crank lever 143 which is pivotally mounted on a bracket 145 secured to the bottom of the base 13 adjacent the opening 130 therein. The arm 143 is biased in or toward a given position by a spring 149, this position being that in which the bell crank lever 143 is in the position shown in Fig. 3 of the drawings. A bread slice engaging bar 151 is pivotally mounted, intermediate its ends, at the upper end of bell crank lever 143 so that it may adapt itself to close surface engagement with one side of a slice of bread being toasted. A pair of spaced lugs 153 are provided on the upper end of bell crank lever 143 adapted to be located in recesses in bar 151 in order to limit the extent of pivotal movement of the bar on the bell crank lever.

Means for causing the bell crank lever 143 to be moved in a clockwise direction, as seen particularly in Fig. 3 of the drawings, include a depending member 155, which as shown in Fig. 3 of the drawings may be of substantially U-shape slidable on a depending arm 157 constituting a part of the bread slice support 33. A spring 159 is located between these two members to yieldingly press the member 155 downwardly to an extent determined by a pin 161 movable in a small slot in the two side portions of member 155. The bottom end of member 155 is adapted to engage an adjusting screw 163 on a substantially horizontally extending lug 165 constituting a part of bell crank lever 143.

My invention includes not only a bimetal bar of the kind hereinbefore described and adapted to be located in close operative engagement with one surface of a slice of bread during substantially all of the toasting period, but it also includes means for compensating for the temperature rise of the toaster casing or of the toaster assembly as well as of the main thermostat itself. This part of my invention includes a substantially fixed contact member 167 mounted on a relatively heavy and stiff spring 169 whose lower end is insulatedly supported on a pivotally mounted bracket 171. A movable contact arm 173 is also insulatedly supported on the same bracket 171 and has secured thereto, at its upper end, a bracket 175, of substantially channel shape, which bracket supports a bimetal bar 177, of substantially U-shape, one end of which is secured to the bracket 175 while the other end has secured thereto a small cylindrical or tubular member 179 of electric-insulating material such as porcelain, which member is adapted to be mechanically engaged by the extreme lower end of bimetal bar 139, in a manner which will be hereinafter described.

The bimetal bar 177 is provided with means for causing it to adapt itself to the varying degree of temperature rise of the bimetal bar itself and of the toaster structure, in a manner and for a purpose to be hereinafter described. This means includes a small machine screw 181 which is mounted on and extends through one arm of the bimetal element 177.

As it may be necessary or desirable, from the view point of a user of a toaster of this kind, to have a manual adjustment of the degree of toasting, I provide manual adjusting means now to be described. The bracket 171 is rigidly supported, as has already been mentioned, on a pivot pin 183, which pivot pin 183 is provided with a bell crank portion 185 for which see Fig. 8 of the drawings. The pivot pin or shaft 183 is supported by the bracket 127. A short helical spring 187 tends to turn the auxiliary or compensating thermostat structure in a clockwise direction, as seen in Fig. 3 of the drawings. A short cam 189 is fixedly mounted adjacent to the inner end of a shaft 191 whose inner end may be supported in the bracket 127, while its outer end is supported in a bracket 193, as shown more particularly in Fig. 4 of the drawings. At its extreme forward end the shaft 191 has fixedly secured thereto an arm 195 having a toothed sector 197 at its upper end, which sector is adapted to be engaged by a pinion 199 mounted on an actuating shaft 201 which shaft is supported in a bracket 203 secured to the front part of the supporting frame 113, as will be seen more particularly by reference to Figs. 1 and 5 of the drawings. A suitable handle, not shown in the drawings, is fixedly secured on the outer end of shaft 201, in a position to be located on the outside of casing 19 so that a user of the appliance may manually adjust the operation of the device.

Referring to Figs. 6 and 7 of the drawings, I have there illustrated two different diagrams of connections which I may utilize in the control of the heating elements. Referring first to Fig. 6 of the drawings I have illustrated a diagram of connections in which the coil 111 is normally shunted or short circuited by the cooperating contacts 167 and 173. In order to energize the latch-releasing mechanism and more particularly the coil 111 it is necessary that the contact members 167 and 173 be disengaged and this operation is the one effected by the structure shown in the drawings and hereinbefore described.

Fig. 7 of the drawings shows a modification thereof in that the coil 111 is energized by engagement of the contact arms 167 and 173, in which case it is necessary to so design the compensating thermostat structure that movement thereof, as by the bimetal arm 139, will cause the desired engagement of these contact arms.

Before setting forth the operation of the above described appliance, a brief discussion of the problem of purely thermal control of a cooking appliance, exemplified in a toaster, may be given here to point out how the problem is met in the toaster structure hereinbefore described. There are three parts or members to be considered in a toaster as to their temperature conditions, first the appliance structure itself, second, the slice of bread being toasted and third, the thermal control element. It may be noted here that the heating element and more particularly the resistor itself operates at a relatively high temperature on the order of 1400° F. and it is desirable to so design and construct the heating element that it has little thermal mass and will heat up quickly. The initial temperature of successive slices of bread is substantially the same, that is they are at room temperature. However, the freshness or staleness of the bread must also be considered, that is whether it is moist or dry, and finally as to the bread itself, whether the bread is light or heavy, as well as the thickness of the slices of bread.

Thus a thin dry slice of bread will be toasted to a desired degree of brownness in a shorter time than will be required for a thick moist slice of bread. It may also be noted that since the temperature of the radiant heat generated by the heating elements is substantially the same and is much higher than the permissible temperature of the surface of a slice of bread, the temperature of the surface of a slice of bread being toasted is a direct measure of the degree of toasting and may be utilized as a control means for stopping the toasting operation as is well known in the art. A fresh moist slice of bread will have a greater thermal mass than a stale dry slice of bread, and a longer time will be required to sear or toast the fresh moist slice of bread than will be required for the stale dry slice of bread, hence the surface temperature as indicated by a bimetal bar in engagement therewith, is a measure of the initial moisture content of the bread slice. The greater the initial moisture content, the lower the surface temperature at the end of a given time or the longer the time required to raise the surface temperature to a given or desired value.

The temperature of the interior of the toaster structure may rise to a value on the order of 400° F., after long continued operation, and its curve of temperature rise is the so-called logarithmic curve, being initially quite rapid, gradually slowing down and then finally flattening out. A curve of this kind is shown in Fig. 9 of the drawings, and is indicated by the numeral 205. From this it will be seen that the curve of temperature rise is not a simple one but is a relatively complicated one. The rise of temperature of the thermal element is substantially the same or at least generally similar to that of the toaster structure, especially so if the thermal control means is properly designed and located in the toaster structure itself.

As has already been hereinbefore set forth it is desired to provide a toaster or, more generally, an assembly for a cooking appliance, that will enable an operator or user of an appliance of this kind to determine in advance the kind of toast to be made by the appliance irrespective of its thermal condition resulting from infrequent intermittent use, from frequent intermittent use, from continuous use, or when starting with a cold structure. The kind of toast is to be determined by the temperature of a surface of a slice of bread being toasted as affected by the thermal conditions of a toaster structure, or possibly by variations in the voltage of a supply circuit to which the heating elements are connected. Let it be assumed that the toaster is cold and that an operator inserts a slice of bread into the casing through the slot in the upper portion thereof, then presses downwardly on the actuating knob 105 to simultaneously close the switch and to move the bread slice support into proper toasting position, all as has hereinbefore been described. The curve of temperature rise is substantially that shown in Fig. 9 of the drawings and since all of the parts were cold at the start a longer time will be required to toast a piece of bread to a desired degree then would be necessary if the toaster were started hot. The length of time required to properly toast a slice of bread may be indicated by the broken line 207 and the temperature value reached by the toaster assembly is indicated by the point 209 on the curve. If now a second piece of bread is located in the toaster and is also toasted to the same degree as was the first slice of bread, the length of time required will be less and will in general be shown by the broken line 211, the temperature of the toaster assembly rising to the value 213. If now a third slice of bread is toasted, without any appreciable delay, a still shorter time will be required for obtaining the same degree of toasting thereof as was obtained for the first two slices and the length of time may be indicated by the broken line 215, the temperature of the toaster assembly now being indicated by the numeral 217 on the curve 205. It is therefore necessary that a fully thermally controlled cooking appliance of this kind be so designed and constructed as to recognize this condition of operation, which is not only effective when starting with a cold toaster, but is also effective, to a greater or to a lesser degree, in the case of intermittent use of the toaster.

As has already been set forth, it is necessary to provide a thermal means which takes into consideration the temperature condition of the toaster structure itself and of the main thermal element 139, and the return bent bimetal element 177 is the means provided by me for taking care of or reflecting the temperature condition of the toaster structure. I have found that the location of this bimetal element, as well as its design and mass must all be considered if it is to reflect the temperature conditions of the toaster. It is obvious that no matter how small the mass of the bimetal element, it will still have a time lag and that it must absorb some heat before it can follow the temperature rise of the toaster structure. The positioning of this auxiliary or compensating bimetal element must therefore be carefully considered, and the location selected and shown in the drawings has been found to be very effective for this purpose.

The cooperation between the bimetal element 139 and the auxiliary or compensating bimetal element 177 may be set forth as follows: when the bar 139 is cold, it will be pressed against a slice of bread with a greater force than when it is hot. Its movement away from the surface of a slice of bread will therefore be greater for a first operation, i. e. starting with a cold toaster, than for a second operation or for succeeding toasting operations, with the temperature of the toaster increasing gradually to a maximum value. If therefore the tubular insulator 179 is located at a given position, relatively to the end of the bimetal bar 139, when all the parts are cold, it should be moved farther away from the end of bar 139, as the temperature of the parts increases, in order that successive slices of bread may be toasted to the same degree.

In addition thereto it is necessary that the response of the free end of the bimetal bar 177 follow very closely the curve 205, hereinbefore described. If no additional means were provided cooperating with the bimetal bar 177 itself, its response would not follow that prescribed by curve 205, but would be directly proportional to the temperature rise, which is not desired. The provision of the small screw 181 permits of obtaining a movement of the free end of bimetal bar 177 which is more directly in accordance with the curve 205 in that it results in a greater initial response of the bimetal element 177 than is obtained when the bimetal element and the toaster structure are at a higher temperature. This particular part of the operation is more clearly disclosed and claimed in my co-pending application S. N. 20,110, filed May 6, 1935, to which application reference may be had for additional details. In general, the end of screw 181 is out of engagement with the other leg of the bimetal bar 177, when the structure is cold, so that the free end of the bimetal bar can move freely, but when the end of screw 181 engages the other leg of bar 177 the movement of the free end is reduced so that its response per unit change of temperature is greater at lower temperature ranges than it is at higher temperature ranges. This enables it to follow very closely the curve 205.

The bimetal bar 177 is so designed and constructed that the high expansion component is on the outside thereof so that the upper end thereof will move toward the right, as seen in Fig. 3 of the drawings, upon an increase in the temperature thereof.

I wish to here point out that the provision of an initially outwardly bowed bimetal bar 139 which is spring pressed into close operative engagement with one surface of a slice of bread, constitutes a very important detail in my invention, since it permits the bimetal element to remain in its initial close operative engagement with a slice of bread during substantially all of the toasting period, so that the bimetal element responds very closely to the temperature rise of the surface of the bread. It is obvious that if the bimetal element were initially straight and in engagement with a surface of a slice of bread when both were relatively cold, it would not remain in such engagement for any appreciable length of time but would be deflected or moved away therefrom so that it would not reflect or mirror the temperature condition of the surface of the slice of bread. I consider the use of an initially deformed relatively small bimetal bar maintained in close operative engagement with a surface of a slice of bread being toasted, during substantially all of the toasting period, as a very important element of my invention. The initial deformation of this bimetal bar is such that it will not be deflected until the temperature of a surface of the slice of bread being toasted has almost reached its maximum value.

Returning now to the initial condition where all the parts of the toaster, including the bimetal members, were cold, it is obvious that the temperature rise of the bar 139 will be substantially the same as the temperature rise of the surface of a slice of bread and that it will remain in said engaging position during substantially all of the toasting operation, which would not be the case if the bimetal bar were initially straight and moved away from the surface of the slice of bread early in the toasting operation. As has just been set forth above, the bimetal bar 177 is to effect a movement of insulating member 179 to the right, as seen in Fig. 3 of the drawings, and the design and construction of the two bimetal members is such that when the temperature of the surface of the slice of bread has reached a predetermined value, which value is dependent upon the degree of toasting desired, the lower end of bimetal bar 139 engages the insulating member 179, whose position is determined by the movement of the free end of bimetal bar 177, and moves it to the right to thereby effect disengagement of the two contact arms 161 and 173. This effects energization of coil 111 of the latch-releasing means, armature 117 is quickly moved upwardly and lug 123 engages the upper end of latch 97 to thereby effect release of the latch with resultant upward movement of the bread slice support and opening of the switch controlling the energization of the heating element.

Simultaneously with the final downward movement of the bread slice support 33 the lower end of member 155 engages the upper end of adjusting screw 163 on the bread slice positioning means, causes a turning movement of the bell crank lever 143 to force positioning bar 155 against the other surface of bread slice 31 with resultant slight lateral movement of the bread slice on its support so that the other surface thereof will be in close operative engagement with the bimetal bar 139 whereby the same is straightened out in the manner hereinbefore described.

The operation of the manual adjusting means hereinbefore described is obvious and no further detailed description thereof is given. It is further obvious that manual adjustment of the shaft 201 results in a different position of the auxiliary or compensating thermostatic structure including more particularly the return-bent bimetal bar 177.

The device embodying my invention thus provides a completely thermal control for a cooking appliance, as exemplified in a toaster, which thermal control responds not only to the temperature conditions of the toaster structure, but also to the degree of moisture initially in a slice of bread being toasted, as well as to the kind of bread, that is as to whether it is light or heavy. My improved toaster is responsive also to varying voltage conditions of an energizing circuit to which the heating elements are connected, since such variations will result in changes in the general temperature conditions of the toaster.

I claim as my invention:

1. An electric toaster comprising in combination, a casing, a heating element therein, a bread slice support spring-biased to one position, means for moving it to and latching it in a second position and thermally-actuated latch-releasing means including an initially outwardly bowed bimetal bar adapted to have substantially its entire length closely operatively engaging the surface of a slice of bread being toasted during substantially all of the toasting period, and means actuated by the bread slice support to effect and maintain said close engagement.

2. A device as set forth in claim 1 and including a second bimetal bar cooperating with the first thermal latch-releasing means, said second bimetal bar being responsive to the temperature within the casing.

3. An electric toaster comprising in combination, a casing, a heating means therein, a control switch for the heating means, a movable bread slice support, a single means for yieldingly biasing the switch to its open position and for biasing the bread slice support to a predetermined position, a single means for manually moving the switch to its closed position and the bread slice support to a second predetermined position, latching means holding the switch closed and the support in its second position, a heat responsive latch releasing means including an initially-deformed bimetal bar having its intermediate portion normally bowed away from a bread slice and adapted to engage the surface of a slice of bread being toasted and means actuated by the means moving the switch to its closed position and the bread slice support to its second position for pressing the slice of bread being toasted into close operative engagement with the bimetal bar over substantially its entire length to cause removal of the initial deformation thereof.

4. An electric toaster comprising in combination, a casing, a heating element therein, a control switch therefor, a bread slice support movable relatively to the heating element into inoperative and operative positions, a single spring means for yieldingly biasing the switch to its open position and the bread slice support to its inoperative position, a manually operable means for moving the switch to closed position and the bread slice support to its operative position, a latching means holding the switch closed and the bread slice support in its operative position, a heat responsive latch releasing means including an initially deformed bimetal bar having its intermediate portion bowed outwardly away from a slice of bread and located in a position in the casing to operatively engage one surface of a slice of bread being toasted and a pivotally mounted arm located adjacent to the other surface of a slice of bread being toasted and moved into close engagement therewith by the manually operable means to press the one surface of the slice of bread tightly against the bimetal bar and straighten out the bar thereagainst.

5. A device as set forth in claim 4 and including resilient means on the bread slice support to compensate for different thicknesses in successive slices of bread.

6. An electric toaster comprising in combination, a casing, a pair of spaced-parallel-extending heating elements, a bread slice support movable between the heating elements into operative and inoperative positions, a spring for biasing the bread slice support to inoperative position, manual means for moving it to operative position, a latch for holding it in operative position, a heat-responsive latch-releasing means comprising an initially deformed bimetal bar having its intermediate portion bowed outwardly away from a slice of bread and located between the heating elements in position to engage one surface of a slice of bread located on said support when in its operative position and a bread-slice-positioning means actuated by the manual bread-slice-support-moving means to press the slice of bread against the bimetal bar.

7. A device as set forth in claim 6 in which the bread slice support includes a resilient member tending to compensate for differences in the thicknesses of slices of bread being toasted.

8. An electric toaster comprising in combination, a casing, a heating means therein, a control switch for the heating means, a movable bread slice support, a single means for yieldingly biasing the switch in its open position and for biasing the bread slice support to a predetermined position, a single means for manually moving the switch to its closed position and the bread slice support to a second predetermined position, latching means holding the switch closed and the support in its second position and thermally-controlled electromagnetic means responsive jointly to the surface temperature of a slice of bread being toasted and the temperature within the casing for releasing the latching means, said thermally-controlled means including a first bimetal bar initially deformed to have its intermediate portion normally bowed away from a slice of bread, means actuated by the bread slice support to cause the bimetal bar to closely operatively engage the surface of a slice of bread being toasted during substantially the entire toasting period, a second bimetal bar responsive to casing temperature adapted to be operatively engaged and moved by the first bimetal bar to control the circuit of the electromagnet, and means carried by the second bimetal bar to cause its response to a certain change in temperature at lower temperature values to be greater than for the same change in temperature at higher temperature values.

9. A device as set forth in claim 8 and including a manually-actuable means for adjusting the initial position of the second bimetal bar.

10. A device as set forth in claim 8 in which said second bimetal bar is return bent upon itself and the said means carried by the second bimetal bar comprises an adjustable set screw mounted on one leg and extending toward the other leg of the return bent bimetal bar.

11. An electric toaster comprising in combination, a casing, a heating element therein, a control switch for the heating element, a bread slice support movable relatively to the heating element, a single spring means biasing the switch to open position and the bread slice support to non-toasting position, a single manually movable means for moving the switch to closed position and the bread slice support to toasting position, a latch for holding the switch closed and the bread slice support in toasting position, a first bimetal bar normally bowed outwardly away from a slice of bread located on the support and having one end fixedly mounted, spring biased means actuated by the bread slice support and adapted to engage one face of a slice of bread to press the other face of the slice of bread into close operative engagement with the first bimetal bar and cause it to be straightened, a second bimetal bar located to be operatively engaged by the other end of the first bimetal bar, a contact movable by the second bimetal bar, a substantially fixed contact cooperating with the first contact, a pivotally mounted support for the second bimetal bar, the movable and the fixed contact, and a latch release circuit controlled by the two contacts.

12. A device as set forth in claim 11 and including an adjusting knob for the pivotally mounted support, located on the outside of the casing and manually movable to vary the time of a toasting operation.

13. An electric toaster comprising in combination, a casing, a heating element therein, a control switch for the heating element, a bread slice support movable relatively to the heating element, spring means biasing the switch to open position and the bread slice support to inoperative position, manually-actuable means for moving the switch to closed position and the bread slice support to operative position, a latch for holding the switch in closed position and the bread slice support in operative position and a thermally-controlled electromagnetic latch-releasing means including a coil, an armature movable by said coil, a latch releasing member carried by the armature, a pair of bimetal bars adapted to engage with and be disengaged from each other to control the energization of said coil, a pair of contact members electrically connected to the coil and controlled by movements of one of said bimetal bars, said one bimetal bar being responsive to the surface temperature of a slice of bread being toasted and being initially bowed outwardly away from a slice of bread and closely operatively engaging the bread surface during substantially the entire toasting period and the other bimetal bar being responsive to the temperature within the casing and means on said other bimetal bar to cause its response for a given change in temperature to be greater for lower temperature ranges than for higher temperature ranges.

14. An electric toaster comprising in combination, a heating element, a control switch therefor spring-biased to open position, a manually-actuable means to close said switch, a latch for holding the switch in closed position and thermally-actuated means for releasing the latch including a bimetal bar having its intermediate portion normally bowed away from a slice of bread being toasted, adapted to have substantially all of its length closely operatively engaging a surface of the slice of bread during substantially all of the toasting period and means actuated by the switch-closing means to effect and maintain said close engagement.

15. An electric toaster comprising in combination, a casing, a heating element, a control switch therefor spring-biased to open position, manually-actuable means to close the switch, a latch for holding the switch in closed position and thermally-controlled electromagnetically-actuated latch-releasing means including a bimetal bar having its intermediate portion normally bowed away from a slice of bread being toasted adapted to have substantially its entire length closely operatively engaging a surface of a slice of bread being toasted during substantially all of the toasting period, means actuated by the switch closing means to effect and maintain such engagement, a second bimetal bar responsive to the temperature of the casing adapted to engage with and be disengaged from the first bimetal bar and an electric circuit containing said electromagnet controlled by the first bimetal bar.

16. An electric toaster comprising in combination, a casing, a heating element therein, a bread slice support spring-biased to non-toasting position, manually-actuable means for moving it to toasting position, a latch for holding it in toasting position and thermally-controlled electromagnetic latch release means including a first bimetal bar having its intermediate portion normally bowed away from a slice of bread being toasted, means actuated by said bread slice support moving means to cause it to be pressed into close operative engagement with the surface of a slice of bread being toasted, a second bimetal bar responsive to the temperature of the casing adapted to engage with and be disengaged from said first bimetal bar to control said electromagnetic latch release and means directly associated with the second bimetal bar to cause its response to predetermined initial rise of temperature to be greater than its response to subsequent predetermined temperature rise to cause successive slices of bread to be toasted to the same degree irrespective of the temperature of the casing.

17. A device as set forth in claim 13 and including an adjusting means for bodily shifting the pair of contact members and having an actuating knob located on the outside of the casing manually movable to vary the duration of a toasting operation.

MURRAY IRELAND.